United States Patent [19]
Chen et al.

[11] Patent Number: 5,831,975
[45] Date of Patent: Nov. 3, 1998

[54] SYSTEM AND METHOD FOR HIERARCHICAL MULTICAST ROUTING IN ATM NETWORKS

[75] Inventors: Xiaoqiang Chen, Eatontown; Vijay Pochampalli Kumar, Freehold, both of N.J.; Cauligi Srinivasa Raghavendra; Ramanathan Venkateswaran, both of Pullman, Wash.

[73] Assignee: Lucent Technologies Inc., Murray Hill, N.J.

[21] Appl. No.: 627,637

[22] Filed: Apr. 4, 1996

[51] Int. Cl.$^6$ ....................................................... H04L 12/56
[52] U.S. Cl. ............................ 370/256; 370/390; 370/408
[58] Field of Search .................................... 370/255, 256, 370/408, 254, 407, 400, 395, 389, 390, 471; 395/200.72

[56] References Cited

U.S. PATENT DOCUMENTS

| | | | |
|---|---|---|---|
| 5,245,609 | 9/1993 | Ofek et al. | 370/256 |
| 5,289,460 | 2/1994 | Drake et al. | 370/256 |
| 5,291,477 | 3/1994 | Liew | 370/256 |
| 5,351,146 | 9/1994 | Chan et al. | 370/408 |
| 5,355,371 | 10/1994 | Auerbach et al. | 370/255 |
| 5,535,195 | 7/1996 | Lee | 370/256 |
| 5,634,011 | 5/1997 | Auerbach et al. | 370/400 |

OTHER PUBLICATIONS

F.C. Liaw, ATM Group Multicast Routing and Signaling Protocol: Architecture Overview, ATM Forum draft 94–0995, 1994.

*Primary Examiner*—Chau Nguyen

[57] ABSTRACT

The present invention extends the PNNI protocols to support hierarchical multicast routing and signaling for ATM networks. The invention utilizes an extension to a core-based tree algorithm. Instead of a single core node, core nodes are maintained in each peer-group and at each level of the hierarchy. The advantage of this is that one single core node is not overloaded. Additionally, this increases fault-tolerance because there are no single points of failure. As would be understood, the present invention is highly scaleable because of the hierarchical nature of PNNI. In addition, the scheme supports multiple senders and dynamic membership changes to the multicast group. Quality of service requirements can be negotiated during connection setup and are guaranteed during the course of the connection. Though some additional topological information has to be flooded in the peer-groups to compute efficient multicast routes, the overheads to the connection management are minimal. The multicast tree is built incrementally and the cost of the tree is comparable to the cost of the Steiner Tree computed using some standard heuristics.

23 Claims, 5 Drawing Sheets

SYSTEM AND METHOD FOR HIERARCHICAL MULTICAST ROUTING IN ATM NETWORKS

FIELD OF THE INVENTION

The present invention relates generally to multicast operations in communications networks, and more particularly to a hierarchical multicast routing scheme in an ATM network architecture.

BACKGROUND OF THE INVENTION

Multicasting (or point-to-multipoint routing) in Asynchronous Transfer Mode ATM) networks is a mechanism for sending ATM cells from one source to multiple destinations using a single connection. A straightforward approach for multicasting would establish point-to-point connections from a source to each of the destinations and the ATM cells would be sent to the respective destinations using these connections. This approach does not work well, however, for applications like video conferencing because such applications require very high bandwidth. Moreover, this approach does not scale well, as the number of multicast applications and the number of destinations per connection increase. A significant challenge is to develop a highly scaleable scheme for multicasting which is also efficient with respect to a combination of factors like bandwidth consumption and delay. A further challenge is to guarantee some quality-of-service (QoS) for each of the connections.

A first step in finding efficient schemes for multicasting is to define a model for the problem. Networks are generally modeled as weighted, undirected graphs. The nodes of the graphs represent the switching systems and the hosts. Edges, on the other hand, represent the physical links. The weight associated with an edge, in some way, reflects the cost of using the link (in terms of delay, bandwidth consumption or distance). The problem of finding a scheme for multicasting reduces to finding a subgraph of the network graph satisfying certain properties. The subgraph must be a tree with the source as the root and the destinations as either internal nodes or the leaves. As would be understood by a person skilled in the art, this tree is called the Steiner Tree of the graph for the given source and destination nodes. Minimizing the cost of the Steiner Tree while satisfying the QoS constraints results in efficient multicasting. It must be noted that the cost of the Steiner tree is the sum of the cost of the individual links that are part of the tree. It has been shown that finding the optimal Steiner Tree is quite a complex problem. But there exist good heuristics, whose solutions can be bounded by a factor of two times the cost of the optimal solution. The problem of finding the efficient tree is called the routing problem for multicasting. In connection-oriented networks, a connection has to be established before the ATM cells can be transmitted. This is achieved using signaling. The problem of efficient connection establishment is termed as the signaling problem in ATM networks.

Multicasting applications can themselves be modeled in several ways, depending on their degree of complexity. The simplest model, referred to herein as Model 1, has a single source sending ATM cells to a fixed set of destinations. In this case, the Steiner Tree can be computed statically before the connection is set up and ATM cells can be transmitted along the links corresponding to edges of the Steiner Tree.

A slightly more complex model, referred to as Model 2, can handle dynamic changes to the set of destinations during the course of the multicast. The destinations are addressed collectively by a multicast group address. ATM cells designated to the group address are forwarded to all the destinations that have registered membership to the group address. Changes in the destination set result in the recomputation of the Steiner Tree.

The above models have only a single user sending data to the multicast group. The complexity of the multicast increases if there are several senders per multicast group (also known as multipoint-to-multipoint connection). In this case, there can be a separate Steiner tree for each sender. However, this would not be scaleable because of the increased complexity of maintaining information about each Steiner tree. One way of overcoming this problem is to associate one tree with the multicast group. One node in the tree, called the core node, is chosen to receive the ATM cells from all senders. The core node is then responsible for sending the cells to all the destinations in the tree. Though this scheme is scaleable, the main problem here is the overloading of the core node, which leads to performance degradation.

Multicast routing in the Internet

In connectionless networks like the Internet, the multicasting problem is slightly simplified because there is no additional overhead of connection setup and management. But, QoS requirements are hard to guarantee because connectionless networks provide only best-effort services. Protocols like RSVP (Resource reSerVation Protocol) provide the means to reserve resources, but implementation of such a scheme is not yet practical.

In connectionless environments like the Internet, several approaches for multicasting have been proposed in the prior art. The simplest approach is termed flooding or truncated broadcast. Here, packets are flooded to all routers in the network and the routers have the responsibility of multicasting the packets within their local subnets. Duplicate packets are discarded by each router. If a "shortest-path" criterion is used to decide which packets to flood and which packets to discard, the resulting scheme is called Reverse-Path Flooding (RPF). The flooding mechanism is inherently based on the hop-by-hop routing scheme in the connectionless Internet. The main disadvantage with flooding is that several redundant packets are transmitted on the links. For high bandwidth video applications, this can lead to congestion in the network, especially when routers have to maintain a separate tree for each sender of a multicast group.

The idea of a Core-Based Tree (CBT) requires the maintenance of only one tree per multicast group. Each multicast group has a core node associated with it. This node is always a part of the multicast tree for that group. A node which wants to receive packets sent to that group must register with the core node. The core node forms a multicast tree with all the destination nodes. When a source wants to send packets to the group, it first sends a packet towards the core node. If any of the intermediate nodes is already on the multicast tree, it then forwards the packet on the links of the multicast tree. The main advantage here is that only one tree is maintained per multicast group which makes it very scaleable. On the other hand, if there are many senders and all of them send the packets to the core node, then the core node can be a bottle-neck. The core node is also the single point of failure, hence this algorithm is not fault-tolerant.

Many of the schemes in the prior art for multicasting are designed for the connectionless model of the Internet. In the future, the Internet will be based on the connection-oriented native ATM networks. Thus, schemes for multicasting in the ATM networks need to be developed. Several higher layer multicasting applications have been envisaged with underlying ATM networks. One such application by IETF's IP-over-ATM working group (IPATM) maps the connectionless IP multicast service over native ATM networks. The scheme uses the concept of a Multicast Address Resolution Server (MARS). All the nodes that want to be members of a particular group register with the MARS. To send data to the multicast group, two schemes have been proposed. In the multicast server scheme, there is a multicast server associated with each multicast group and there may be more than one server to take care of load balancing and fault-tolerance. The multicast servers also register with the MARS. The sender contacts the MARS and gets the identity of the server where the MARS then establishes connection with the server. The server has a point-to-multipoint connection with all the destination nodes and is responsible for transmitting the data to all the destinations. New destinations also contact the MARS and then join the server's point-to-multipoint connection. In the absence of a multicast server, the MARS returns the list of all the destinations to the sender. The sender then sets up a point-to-multipoint connection with all the destinations. This scheme assumes the existence of an underlying point-to-multipoint protocol for native ATM networks.

Other applications like video-conferencing require the underlying system to support multicasting while guaranteeing certain quality of service like consistent bandwidth, bounded delays and bounded delay-jitter. It is not easy to provide end-to-end guarantees and quality of service when a hop-by-hop routing mechanism is used. This is the main motivating factor for developing protocols for multicasting in ATM networks.

Routing and Signaling in ATM Networks

Routing and signaling are two main components in the design of a connection-oriented protocol. Routing protocols help in the computation of an efficient path for the specific connection. Signaling protocols assist in efficient establishment and management of the connection.

A signaling mechanism handles set-up, maintenance and clearance of connections between a source and possibly more than one destination. During connection setup, the resources on the links are also reserved so that quality of service(QoS) can be guaranteed for the connection. The ATM Forum has proposed ATM UNI Signaling mechanisms at the user network interface.

The basic point-to-point signaling protocol is a two-way hand-shaking mechanism. Some signaling messages are global in nature, that is, they are propagated from the source end to the destination end. Local acknowledgment messages are used to acknowledge the receipt of global messages as they pass from one node to another in the network. The source (which is an ATM end-system) sends a SETUP message to the switching system over the User-Network Interface. This message includes information like destination address and the QoS requirements. The network forwards the SETUP message towards the switching system to which the destination end-system is attached. Resources are reserved en route to guarantee QoS requirements.

When the SETUP message reaches the destination, the destination can either accept the connection or reject it for any one of various reasons. For example, one important reason could be that QoS guarantees cannot be fulfilled. If the connection is rejected, a RELEASE message is sent from the destination which propagates back to the source, where all the resources that were previously reserved are released. If the connection is accepted, a CONNECT message is sent from the destination which propagates through the network to the source. This ends the connection establishment phase of the signaling mechanism. Additional signaling messages are then required to maintain this connection. The entire signaling protocol can be represented by a state diagram for each participant of the protocol. Whenever a node sends or receives a message, a transition is made from one state to another.

The basic point-to-multipoint connection is a tree-based model with a root and several leaves. The connection is initiated with the establishment of a point-to-point connection from the root to one of the leaves. The address of the root node forms a part of the connection identification. Additional connections to other leaves are established by sending an ADD-PARTY signaling message to each of the leaves. Dynamic membership is supported in two ways. In the root-initiated join mechanism, the root sends the ADD-PARTY message to a leaf that is interested in joining the multicast connection. The leaf responds with a CONNECT message to indicate success of the connection.

In the leaf-initiated join(LIJ) mechanism, the root initiates a connection with LIJ options. The leaf indicates the willingness to join the multicast connection by sending a LEAF-SETUP-REQUEST message to the network. Since the network is aware of the LIJ connection, it sends a SETUP message to the leaf. Successful connection establishment is indicated when the leaf sends a CONNECT message to the network. Depending on the protocol, the network may or may not notify the root about the identity of the joined leaf. Similar mechanisms are available to drop a leaf node from a particular connection.

The current UNI signaling mechanisms do not, however, address the issue of the establishment of a multipoint-to-multipoint connection. One way of implementing this type of connection is to use a peer-to-peer model. In this model, there is no root node and all the participating nodes have similar functions. Some participants are senders or receivers alone, while others are both. The group is then logically identified by a multicast group address.

Private Node-Network Interface (PNNI)

The routing of the signaling messages between ATM switches uses the NNI (Node-Network Interface) protocol. The main difference between UNI and NNI protocols is that NNI protocols have to incorporate routing as well as signaling. The signaling component of the NNI protocol is used to relay connection requests through the ATM network. The routing component of the NNI protocol determines the route used by the signaling messages to propagate through the ATM network. The connection is also established on this route and subsequently, the data also flows through this route. The routing of signaling messages is similar to a connectionless routing protocol because no connection exists before connection setup.

Figure 1:
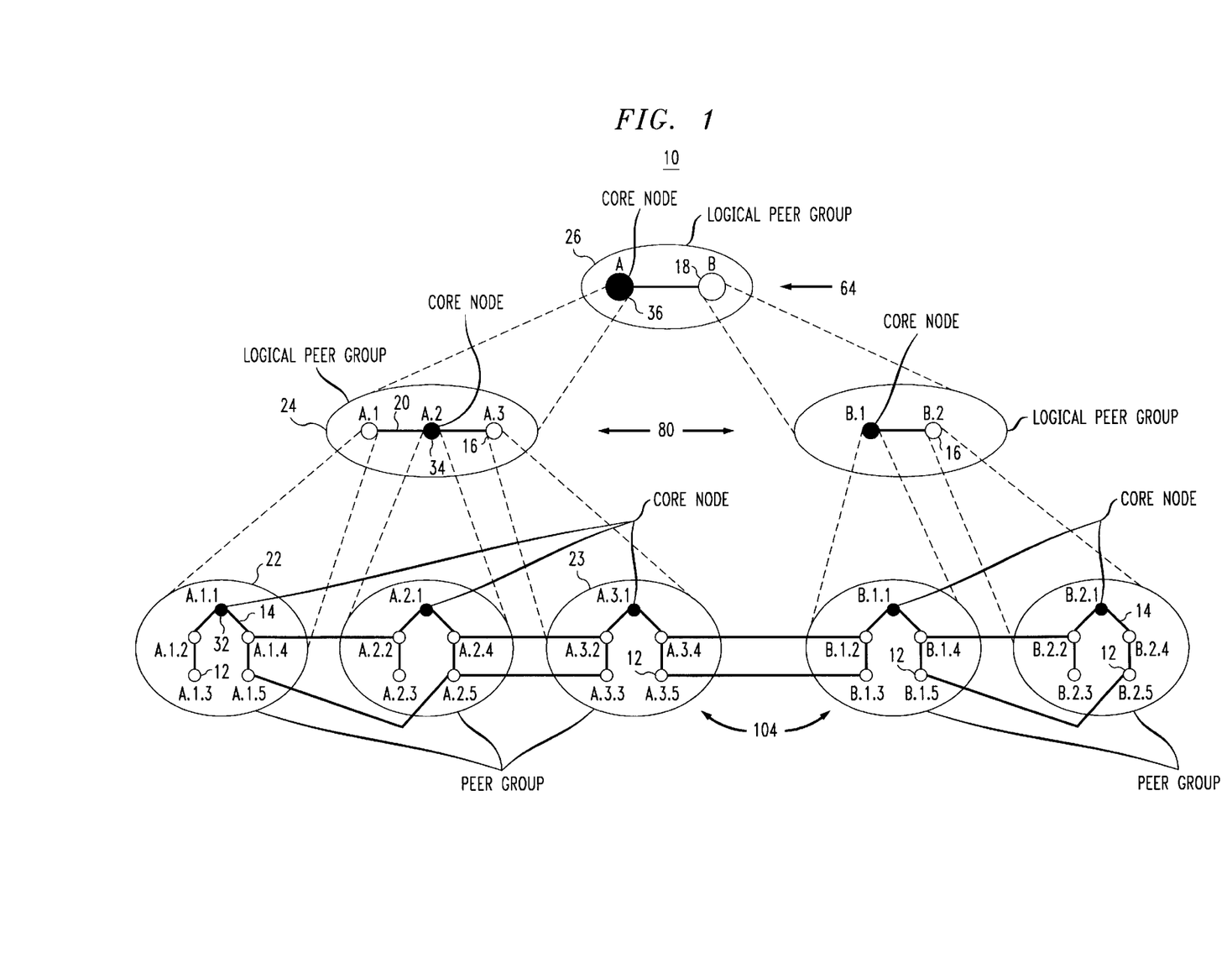
FIG. 1 shows an illustration of a multicast tree within a PNNI Architecture and in accordance with the present invention.

To ensure inter-operability among various ATM switches developed by different vendors, the ATM Forum has proposed a NNI protocol called the Private Node-Network Interface protocol. PNNI protocols are based on link-state routing protocols like the OSPF protocols. The protocol model provides a hierarchical view of the ATM network. In this model, the hierarchical graph consists of nodes and links. An example PNNI Architecture 10 is shown in FIG. 1. At the lowest level 104 of the hierarchy, the nodes 12 of the graph represent the physical switching systems. The links 14 at the lowest level 104 represent physical links that connect the various switching systems. At higher levels 80, 64, the nodes 16, 18 are logical nodes, where each logical node 16, 18 represents a collection of nodes at the lower level of hierarchy. Similarly, a link 20 between two logical nodes is a logical link that represents connectivity between the sets of nodes represented by the logical nodes. Nodes at each level are grouped together to form Peer Groups 22, 24, 26 (represented by ellipses in FIG. 1). Each peer-group has a peer-group leader (PGL). In FIG. 1, the PGLs for peer groups 22, 24, 26 are represented by dark nodes 32, 34, 36. A PGL has the additional functionality of representing the peer-group as a logical node at the higher level of the hierarchy. At the lowest level 104, the links 28 that connect nodes belonging to different peer groups are called border links. The nodes on either side of a border link are called border nodes. For example, in FIG. 1, nodes A.2.4 and A.3.2 are border nodes.

Similar to OSPF, efficient routes can be computed only by collecting information about states of the nodes and the links in the network. This information constitutes the topology information of the network. The link state includes information like the available bandwidth, the mean delay on the link and the peak cell rate that can be supported by the link. The node state includes aggregate information about the peer-group and the end systems attached to the switching system. Each node periodically floods the topology state information within its peer-group. Other nodes that belong to the peer-group update their databases with this information. Thus, each node in the peer-group has accurate information about the node and link states of all the topology elements within the peer-group. The PGL aggregates the information of the peer-group and floods this aggregated information in the higher level peer-group. Similarly, the PGL also collects aggregated information about other peer-groups through their respective PGLs. The PGL floods this collected information in the lower level peer-group. Thus, every node in the lower peer-group updates its database with the aggregated information about the nodes in the other peer-groups. The maintenance of this information is not very difficult even for large networks because only the aggregated information is stored in the nodes. This makes the PNNI protocol highly scaleable to large networks. The same protocol is followed by the nodes at each layer of the hierarchy, hence the protocol is termed as recursive.

The point-to-point routing protocol as specified currently is source-based routing. The source has complete information about all the nodes and links within its peer-groups, but it has only aggregated information about the nodes and links in other peer groups. The source cannot determine the exact route to the destination node. Based on the information available to it, the source computes a logical path to the destination node. This path can involve logical nodes from higher layers of the hierarchy. The actual route at each level of the hierarchy is determined during the setup of the connection. The route depends on the QoS requirements of the connection. Signaling messages are used to establish the connection and negotiate QoS requirements.

PNNI Signaling

Signaling is the mechanism by which the connection is set up in a connection-oriented protocol. The signaling incorporates functions like resource reservation, virtual channel/path establishment and QoS negotiations. In PNNI, the signaling mechanism is similar to ATM UNI Signaling, however, PNNI incorporates additional information like the Designated Transit List (DTL), which represents the approximate route for setting up the connection. The DTL is a set of paths, one for each level of hierarchy. At the lowest level of the hierarchy, the path is a physical path between two nodes within a peer-group. At higher levels of hierarchy, the paths are logical paths. Within a peer-group, the SETUP message traverses along the designated path, until it reaches a border node. This border node is called the exit border node or the egress node. The edge linking the border nodes of the two peer-groups is represented as a logical link at a higher layer. If this logical link is present in the DTL, the SETUP message is passed to the neighboring peer-group across the border link. The border node in the neighboring peer-group is called the entry border node or the ingress node. If the destination node is in this peer-group, the ingress node computes the path to the destination node and appends it to the DTL. Otherwise the ingress node computes the path to the border node which has a link to the peer-group that is on the path to the destination node. The computed path is appended to the DTL. The ingress node also stores this path information until the connection is set up. Only the source node and the ingress nodes can add paths to the DTL. This is important during crankback because it can prevent looping and unnecessary repeated exploration of failed paths.

Crankback occurs if a node on the pre-determined route is not able to find a path through its peer-group. This could be because of node or link failures or stringent QoS requirements. This node then informs the ingress node of the peer-group that it cannot find a path. The ingress node can then try alternate routes to reach the destination. The signaling mechanism stops once the destination node is reached or no path is available. If no path is available, the connections setup so far are cleared. If the destination node accepts the connection, a CONNECT message is sent from the destination to the source along the established path (in the reverse direction). This enables all the ingress nodes to clear all the route information, which they have stored to assist crankbacks.

Phase 1 of the PNNI protocol deals primarily with point-to-point routing and signaling. Phase 2 of the PNNI protocol will deal with point-to-multipoint routing. Some work has been done in the prior art in this area by F. C. Liaw, *ATM Group Multicast Routing and Signaling Protocol: Architecture Overview*, ATM Forum draft 94-0995, 1994, wherein the idea of a core based-tree with multiple core nodes is mentioned. Although the idea of multiple core nodes is presented here, this paper does not provide the details of the routing and signaling mechanisms in a hierarchical framework. Accordingly, there is a need to develop a highly scaleable scheme for multicasting in a hierarchical framework which is also efficient with respect to a combination of factors like bandwidth consumption and delay, while guaranteeing some quality-of-service (QoS) for each of the connections.

SUMMARY OF THE INVENTION

The present invention extends the PNNI protocols to support hierarchical multicast routing and signaling for ATM networks. The invention utilizes an extension to a core-based tree algorithm. Instead of a single core node, core nodes are maintained in each peer-group and at each level of the hierarchy. The advantage of this is that one single core node is not overloaded. Additionally, this increases fault-tolerance because there are no single points of failure. As would be understood, the present invention is highly scaleable because of the hierarchical nature of PNNI. In addition, the scheme supports multiple senders and dynamic membership changes to the multicast group. Quality of service requirements can be negotiated during connection setup and are guaranteed during the course of the connection. Though some additional topological information has to be flooded in the peer-groups to compute efficient multicast routes, the overheads to the connection management are minimal. The multicast tree is built incrementally and the cost of the tree is comparable to the cost of the Steiner Tree computed using some standard heuristics.

In one embodiment of the invention, a method is set forth for multicasting cells in a communications network. The communications network includes a plurality of nodes coupled to one another by links and comprises the steps of: dividing the communications network into a hierarchical arrangement of peer groups, wherein a peer group includes at least one of the nodes therein; building a multicast tree for a multicast group which includes all participant nodes, wherein a participant node is either a sender or receiver of data for the multicast group. The step of building including the steps of: selecting core nodes for each of the peer groups within the multicast group, wherein a node wanting to become part of the multicast group must register with the core node in its peer group; and flooding core node information locally within each of the peer groups, wherein the nodes of a peer group need only maintain information about the core nodes of direct ancestor peer groups. Cells are able to be efficiently multicast by way of said multicast tree to said nodes in said multicast group. A peer group leader is selected for each of the peer groups in the network for aggregating topology information of nodes in the peer group and flooding the topology information in higher level peer groups, wherein a list of logical core nodes of ancestor peer groups is flooded in a peer group by each said peer group leader.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION

The present invention describes a methodology for multicast routing in the PNNI framework. The scheme is highly scaleable to large networks because routers have to maintain only one tree per multicast group. The method supports dynamic membership to a multicast group, in that, nodes can join or leave the multicast group during the course of the multicast. Multiple senders to the multicast group are also supported, which enables realization of a true multipoint-to-multipoint connection. In addition, the multicast tree can be dynamically changed to reflect changes in the node and link states. The invention also has very low latency, that is, the join time of a new node is significantly small.

The present invention utilizes an extension of a core based tree (CBT) methodology to accomplish the multicast routing. One of the drawbacks of CBT algorithms of the prior art is that the core node becomes a bottle-neck and a single point of failure. To overcome this drawback, the present invention uses more than one core node per multicast group. In the PNNI framework, introduction of a core node in each of the peer-groups that is within the scope of the multicast results in a highly modular algorithm. Logical core nodes are also introduced at higher levels of the hierarchy. Using these core nodes, a multicast tree is built to include all the participant nodes, wherein a participant node is either a sender or a receiver of data for the multicast group. The selection of core nodes is very crucial because a wrong set of core nodes can adversely affect the performance of the algorithm. Although the study of various schemes for core node selection is beyond the scope of the present invention, some criteria has been included which will help in determining good candidates for the core node.

Core Node Selection

When a multicast group is set up, the core nodes for that group are also selected, wherein each group has its own set of core nodes. To compute efficient multicast trees, it is important to have the right set of core nodes. Border nodes are good candidates for core nodes. Intuitively, this makes sense because border nodes are more likely to be a part of the multicast tree. Nodes with larger degree also make better core nodes. Since core nodes have to handle high bandwidth, it is clear that nodes without sufficient bandwidth are poor choices as core nodes. It cannot be proven that one of these criteria is more important than the other, however, a border node with a large degree and sufficient bandwidth seems to be the best choice as a core node. As would be understood, care must be taken so that the same nodes do not get selected as the core nodes for several multicast groups, as heavily loaded core nodes will adversely affect performance.

Once the core nodes are selected, core node information is flooded locally within each peer-group. A list of logical core nodes of ancestor peer-groups is also flooded by the peer group leader (PGL). The amount of information flooded is minimal because the nodes of a peer-group need not maintain the information about core nodes of peer-groups that are not direct ancestors. This flooding can be incorporated along with the flooding of topology state information. Once selected, it is assumed that core nodes will not change, however, as would be understood, this restriction is not binding.

In the present invention, a core node is defined to be active if there is a participant node in the same peer-group to which the core node belongs. The present invention requires that the following conditions be met at all times: all active core nodes must be on the multicast tree; if there is an intermediate (non-participant node which is on the multicast tree) node belonging to a particular peer-group, the corresponding core node must be on the multicast tree; and if there is no participant node in a particular peer-group, the corresponding core node and intermediate nodes of that peer-group must be pruned from the multicast tree, provided it does not disconnect the tree. These conditions result in a well-balanced tree and addition and deletions of participant nodes can be done with minimal latency.

Participant-Initiated Join (PIJ)

In the participant-initiated join (PIJ) mechanism, when a node wants to join the multicast group (referred as joining node), the joining node tries to attach to the core node within its peer-group. The shortest path to the core node can be easily determined because the node and link states within the peer-group are completely known to all nodes in the peer-group. A setup message is sent to the core node along this shortest path. En route, if the message reaches a node that is already on the multicast tree, the joining node attaches to this particular node and becomes a part of the multicast tree.

It can happen that the core node in the peer-group of the joining node is not currently on the multicast tree. The core node then tries to join the core node of the parent peer-group. The routing is recursively followed at each level of hierarchy until an active core node or the core node of the topmost peer-group is reached. This results in the building of a backbone tree consisting of active core nodes. The joining node along with all the involved core nodes then becomes a part of the multicast tree.

Figure 2:
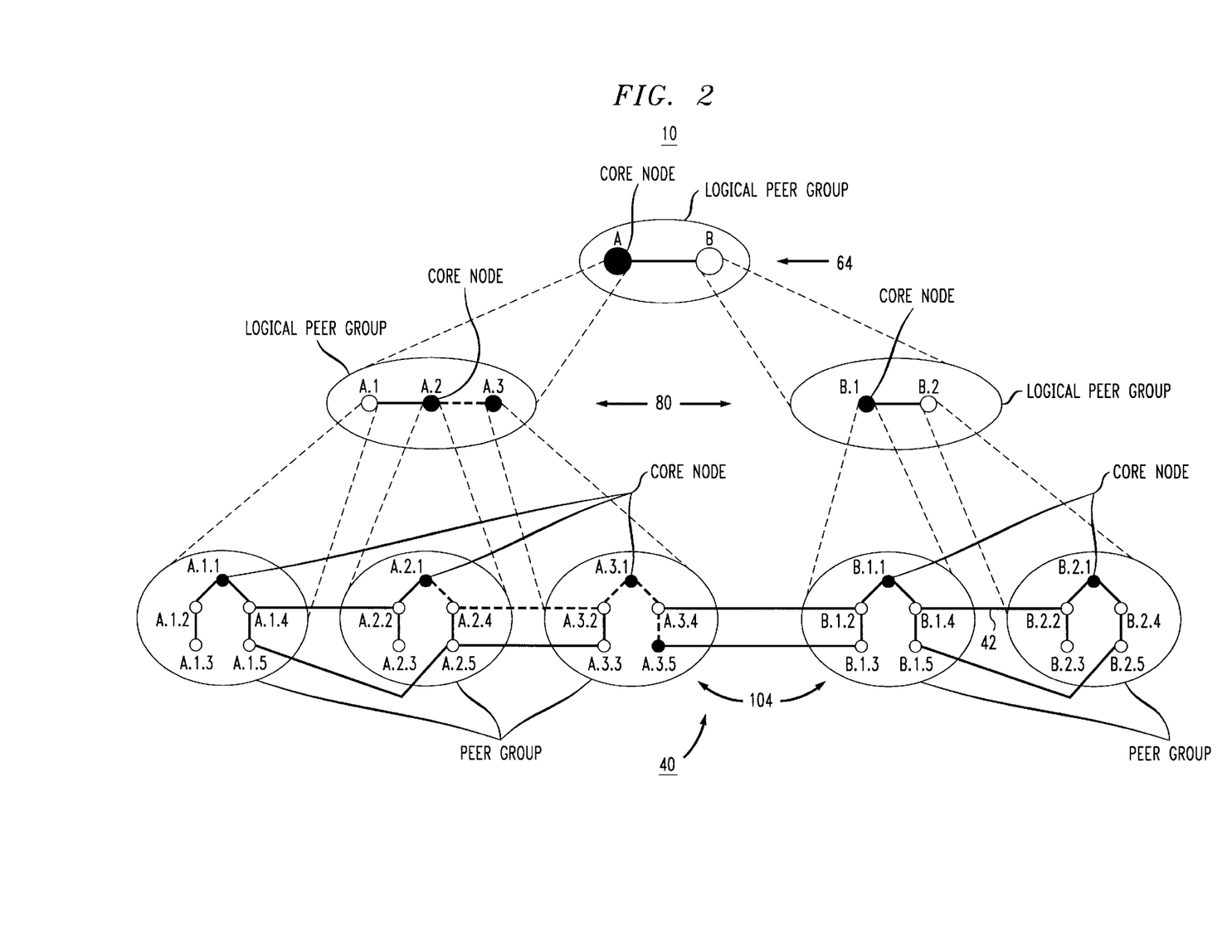
FIG. 2 shows an illustration of a multicast tree in accordance with the present invention after a node joins the multicast tree.
Figure 3:
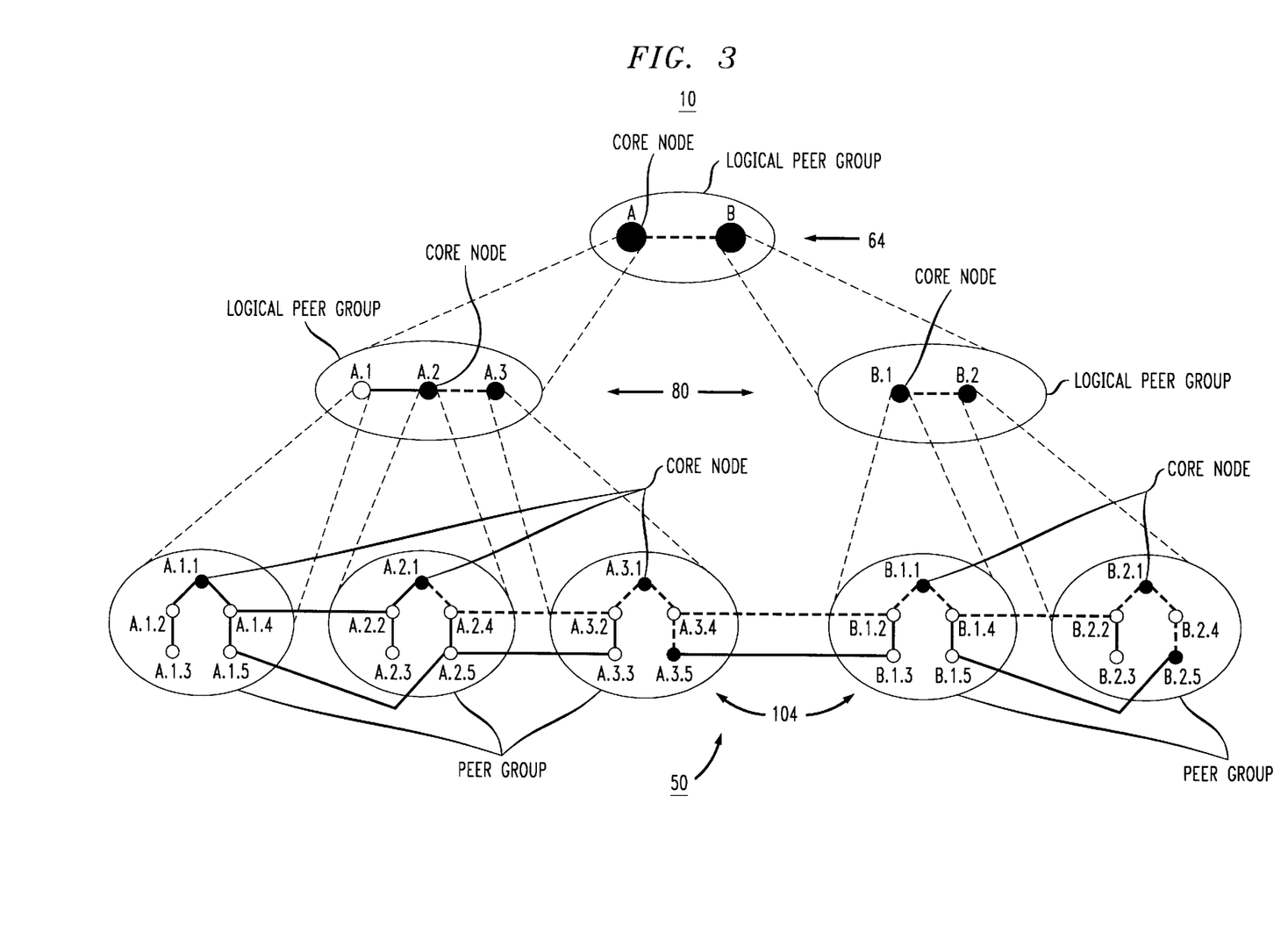
FIG. 3 shows an illustration of the multicast tree after a first and second node join.

The PIJ mechanism of the present invention can be further explained with reference to FIG. 1. FIG. 1 depicts a hierarchical network 10 in accordance with the present invention, wherein the dark nodes are representative of core nodes. A multicast tree is shown, wherein initially the nodes A, A.2 and A.2.1 are on the multicast tree. When node A.3.5 wants to join the multicast tree, it first joins the core node within its peer-group 23, that is, node A.3.1. Since A.3.1 itself is not on the multicast tree, the algorithm is recursively executed at the next higher level 80 resulting in the node A.3 joining the core node A.2. The resulting tree 40 is shown in FIG. 2. Now, if node B.2.5 wants to join the multicast group, it first joins node B.2.1. At level 80, B.2 joins B.1. Let the logical link (B.2–B.1) be represented by the physical link (42) B.2.2–B.1.4. At level 104, the physical path (B.2.1, B.2.2, B.1.4,B.1.1) is appended to the multicast tree. Since B.1 itself is not on the tree, the node B at level 64 joins node A. Let the logical link (B–A) be represented by the logical link B.1.2–A.3.4. This results in the path (B.1.1,B.1.2,A.3.4) being appended to the multicast tree. The resulting tree 50 is shown in FIG. 3. Nodes B.1.3 and B.1.5 can easily join the multicast group by attaching to nodes B.1.2 and B.1.4 respectively. Thus, the latency of joining improves significantly in this algorithm.

Deletion of Nodes

In describing the deletion of nodes from a multicast group, let the multicast tree which connects all the participant nodes and the active core nodes be considered as a graph. When a participant node, whose degree is more than 1, tries to leave the multicast group, it remains on the multicast tree as an intermediate node. When a participant node, whose degree is 1, tries to leave the multicast group, it prunes itself from the tree, provided it is not a core node. This pruning can result in the degree of the neighbor node to become 1. The neighbor node then prunes itself, if it is neither the core node nor a participant node. This process is repeated, resulting in a cascade of prunes. The cascade continues until a participant node or a core node or a node with degree more than 1 is reached.

Whenever a participant node leaves the multicast group, the core node in that peer-group is also informed. If the core node finds that there are no more participant nodes within its peer-group, it can delete itself from the multicast tree, provided it does not disconnect the tree. This is done at the logical level as well. The deletion of a logical link results in some physical nodes also being deleted. The pruning keeps the cost of the tree within reasonable limits, especially when there are few participant nodes.

Figure 4:
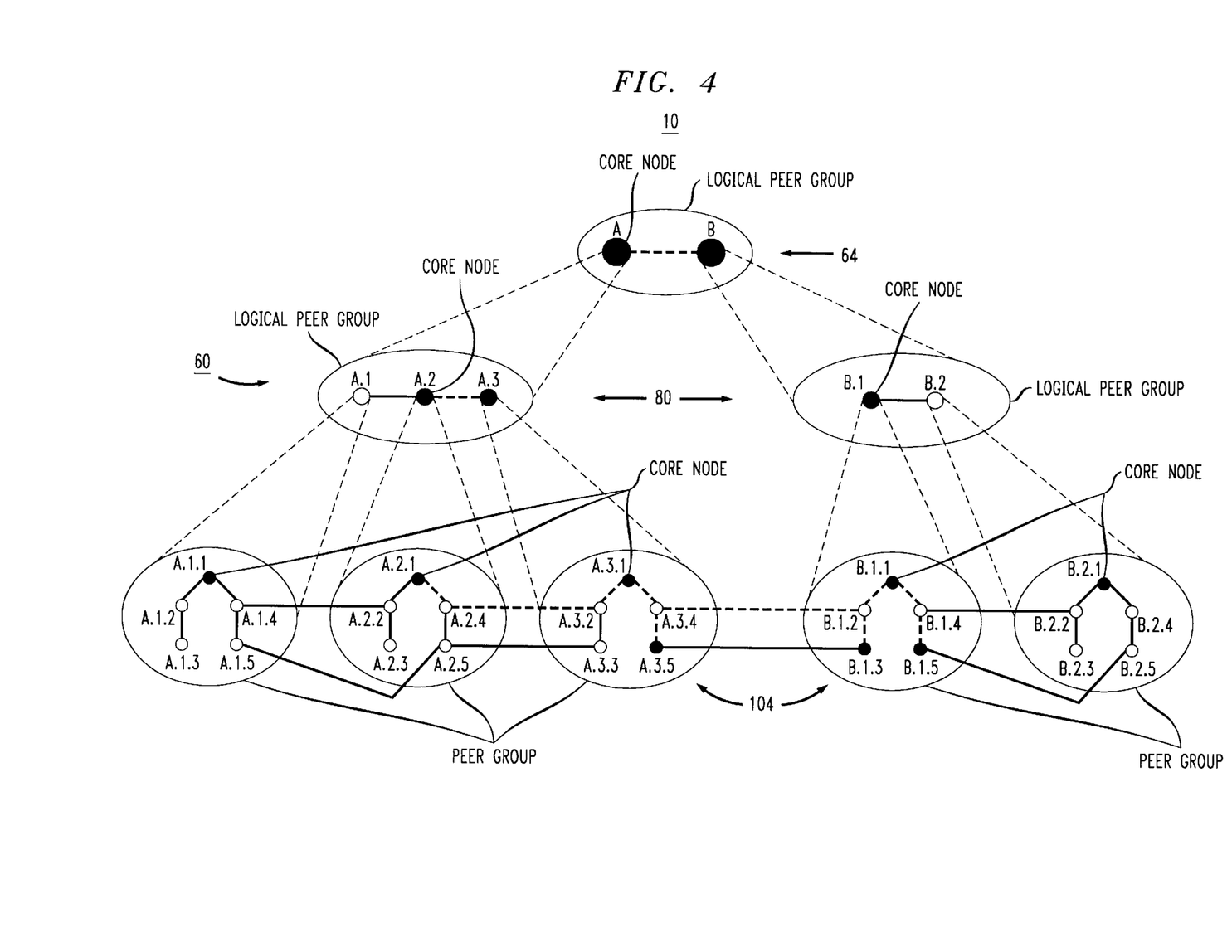
FIG. 4 shows an illustration of a multicast tree after a node leaves the multicast group.

Referring to FIG. 4, an example is shown with participant nodes B.2.5, B.1.3, B.1.5 and A.3.5 for the deletion of nodes in the multicast of network 10. As can be seen, if node B.2.5 wants to leave the multicast group, the nodes B.2.5 and B.2.4 get pruned. At level 80, node B.2 finds that there are no participant nodes within the peer-group it represents. So, node B.2 prunes itself, resulting in nodes B.2.1 and B.2.2 pruning themselves from the multicast tree. The resulting tree 60 is shown in FIG. 4. Now if B.2.5 wants to rejoin the multicast group and the link states have changed, a different path may get appended to the existing tree. This dynamic creation of tree helps in satisfying the QoS requirements of the connection under varying node and link states.

Signaling Mechanisms

In order to add a node to an already existing multicast tree some sort of signaling mechanism is needed. In one embodiment of the present invention, a peer-to-peer implementation is described, however as would be understood by those skilled in the art, other ways of implementing the instant routing algorithm are available. In the peer-to-peer scheme, the multicast group is represented by a logical multicast address. All the nodes interested in the multicast group are participant nodes. There are no root or leaf nodes. The node that wants to join the multicast group sends a SETUP message towards the core node within its peer-group. The path to the core node is expressed in terms of a Designated Transit List (DTL), as has been explained with respect to PNNI Signaling, and as would be understood by a person skilled in the art. This is a point-to-point mechanism in the sense that one branch is usually added to the existing multicast tree. Since core nodes are involved, it can happen that core nodes also get added to the tree as additional branches. Addition of more than one branch to add a single node is a distinct feature of the present invention.

The basic types of messages for the signaling mechanism of the present invention are a SETUP message, RETRACE message, CONNECT message, and RELEASE message. The SETUP message originates at the joining node to set up a connection. The destination for this message is either a node on the multicast tree or the core node in the peer-group. When this message passes on a link from one node to another, resources for the connection are reserved on that link. This message carries the Designated Transit List (DTL), which is the approximate path to be followed by the signaling messages. This path is computed by the source of the message in source-based routing. In the present invention, the DTL created by the source can be modified by an ingress node to the peer-group, an egress node to the peer-group and a core node of the peer-group. Note that this is very different from the PNNI signaling where only the source and the ingress node can modify the DTL.

The RETRACE message is a new type of message that has information similar to the SETUP message. A key difference, however, is that no resources are reserved on the links. Further, the RETRACE message traverses only on the links already traversed by the SETUP message, and in the opposite direction.

The CONNECT message is sent by the node to which the joining node attaches. Note that this node must already be a part of the multicast tree. The message traverses on all the links on which resources are reserved. When a node receives the CONNECT message, it updates its routing tables to indicate the setting up of the connection.

The RELEASE message can be sent by any of the intermediate nodes, in case the connection cannot be established, or to terminate the connection. This message also traverses on all the links on which resources are reserved. The resources are released upon receipt of this message.

Upon receiving a particular message, the actions taken by a node depend on the type of the message. For instance, with the SETUP message, if the node is already on the tree, that node sends a CONNECT/RELEASE message to the joining node, depending on whether the connection is accepted/ rejected. The message follows the reverse path to the joining node.

If the node is not on the multicast tree, it checks the DTL and forwards the message to the next node in the DTL and also forwards the pointer. If the node is an egress border node, it saves the list of the nodes visited by the SETUP message and forwards the message across the border link. If the node is an ingress border node, it computes the path to the core node of the peer-group. The path is converted to DTL format and pushed onto the stack. The SETUP message is then forwarded according to the new DTL (towards the core node).

If the node is a core node, it first checks if it is active. If it is, then it has to be on the tree, wherein this case has been discussed above. If it is not active, the core node computes the path to the next peer-group in the DTL. This path is converted to a DTL and pushed on to the stack. If any node on this path has already been visited by the SETUP message (this can be found out using the list of visited nodes), the SETUP message is changed to a RETRACE message. The entries in the DTL are removed until the first entry on the top is the visited node and no other entry in the DTL is a visited node. The RETRACE message is forwarded towards the node from which the SETUP message was received. If there are no visited nodes in the computed path, the SETUP message is forwarded as per the new DTL.

If the core node is not active and the DTL stack is empty, the core node forwards the SETUP message towards the core node of the parent peer-group. The path to this core node and the corresponding DTL is computed. Again, a check for a visited node is made. In case a visited node is found, the message is changed to a RETRACE and the DTL is modified as explained above. If no visited nodes are found, the SETUP message is forwarded as per the new DTL.

In the case of the RETRACE message, if the first entry on top of the DTL stack does not match with the node ID or its ancestor ID, the RETRACE message is forwarded towards the node from which it received the SETUP message.

If the entry matches, the path (and the new DTL) to the next entry as per the DTL is computed. Again, a check for visited nodes is made. If there is a visited node, the DTL is modified as explained above and the RETRACE message is forwarded towards the node from which it received the SETUP message. If there is no visited node, the RETRACE message is changed to a SETUP message and forwarded to the next node as per the new DTL.

For the CONNECT/RELEASE message, the resources reserved on the link are committed/released. The node forwards this message on all the links on which a SETUP was received/sent, except the link on which this CONNECT/RELEASE is received. It must be noted that this message traverses on all the links traversed by the SETUP message, but in the opposite direction.

A Signaling Example

Figure 5:
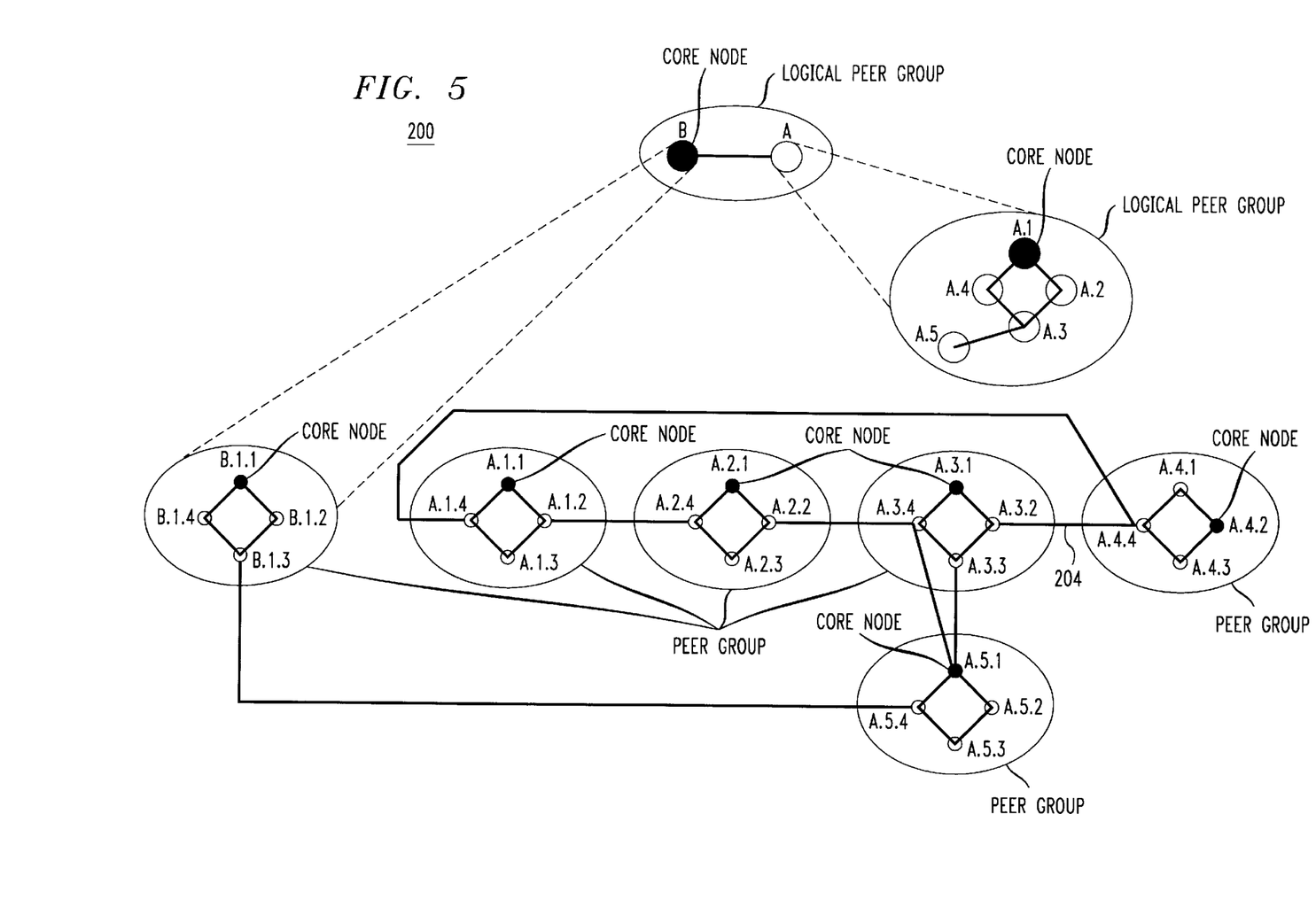
FIG. 5 shows an illustration for an exemplary architecture for signaling in accordance with the present invention.

Referring to FIG. 5, an exemplary illustration of the present invention signaling mechanism is shown utilizing network 200. As shown in FIG. 5, dark nodes are representative of core nodes. In this example, assume that node B.1.1 is already on the multicast tree. Now, if node A.3.4 wants to join the multicast group, it first sends a SETUP message towards the core node in its peer-group (node A.3.1). The SETUP message is forwarded to node A.3.1. Since node A.3.1 is not active and the DTL stack is empty, the node tries to join the core node A.1 of the parent peer-group. Let the path to core node A.1 be through peer-group A.4. The DTL for the path looks like:

(A.3.1, A.3.2) pointer 1

(A.3, A.4, A.1) pointer 1

Along with the DTL, a list of nodes visited by the SETUP message in the current peer-group is also passed along. This is used by the ingress, egress and the core node to determine loopless paths.

The SETUP message is forwarded to node A.3.2. Since node A.3.2 is an egress node, it remembers the list of visited nodes (namely, nodes A.3.4, A.3.1 and A.3.2). It then forwards the SETUP message across the border link 204 to node A.4.4. Since A.4.4 is an ingress border node, it computes the path to its core node (node A.4.2). Let this path be through A.4.1. The DTL here is as follows:

(A.4.4, A.4.1, A.4.2) pointer 1

(A.3, A.4, A.1) pointer 2

The SETUP message is forwarded to node A.4.2 through A.4.1. Since A.4.2 is a core node that is not active and the DTL stack is not empty, it computes a path to peer-group A.1. Let this path go through node A.4.3. The DTL now looks like:

(A.4.2, A.4.3, A.4.4) pointer 1

(A.3, A.4, A.1) pointer 2

Since node A.4.4 has already been visited by the SETUP message, the message type is changed to a RETRACE message and the DTL is changed as follows:

(A.4.4) pointer 1

(A.3, A.4, A.1) pointer 2

The RETRACE message is forwarded to the node from which the SETUP message was received (node A.4.1) and then to A.4.4. Now the first entry on top of the stack matches the node ID. Accordingly, a path to peer-group A.1 is computed. Since node A.4.4 itself is an egress border node, there is no visited nodes in the path. So, the RETRACE message is changed to a SETUP message and forwarded across the border link to node A.1.4. Since A.1.4 is an ingress node, it finds the path to its core node. The DTL now looks like:

(A.1.4, A.1.1) pointer 1

(A.3, A.4, A. 1) pointer 3

When A.1.1 receives the SETUP message, the DTL stack becomes empty. Since node A.1.1 is not active, it forwards the SETUP message to the core node of its parent peer-group (node A.1). Since we are already in peer-group A.1, the SETUP message is forwarded to the core node in its parent peer-group (node B). The path to peer-group B is computed. Let the path go through peer-groups A.2, A.3 and A.5. The DTL for this path is:

(A.1.1, A.1.2) pointer 1

(A.1, A.2, A.3, A.5) pointer 1

(A,B) pointer 1

But, we find that node A.3 has already been visited by the SETUP message (this is known to node A.1). SETUP is changed to the RETRACE message and the DTL is changed as follows:

(A.3, A.5) pointer 1

(A, B) pointer 1

The RETRACE message is forwarded to node A.1.4 which forwards it to A.4.4 and then to A.3.2. Now, the first entry on the top of the stack matches the ancestor ID of node A.3.2. The path to peer-group A.5 is computed. For the sake of this example, let the path go through A.3.1 and A.3.4. The DTL for this path is:

(A.3.2, A.3.1, A.3.4) pointer 1

(A.3, A.5) pointer 1

(A, B) pointer 1

Since A.3.4 is already visited by the SETUP message, the SETUP message is changed to a RETRACE message. The DTL is changed to:

(A.3.4) pointer 1
(A.3, A.5) pointer 1
(A, B) pointer 1

The RETRACE message is forwarded to the node from which node A.3.2 received the SETUP message (node A.3.1). From node A.3.1, the RETRACE message is forwarded to A.3.4. Now, the first entry on top of the stack matches the node ID. So, a path to peer-group A.5 is computed. The message is changed to SETUP since there are no more visited nodes. The SETUP message is now forwarded to node A.5.1. A.5.1 is a core node and the DTL stack is not empty. So, the path to peer-group B is computed. The SETUP message is then forwarded to node A.5.4 and then to node B.1.3.

Since node B.1.3 is an ingress node, it computes the path to its core node (node B.1.1). When B.1.1 receives the SETUP message, it is already active (on the multicast tree). So, it sends a CONNECT message towards the node A.3.4. This message passes through all the links on which the resources were reserved. When the message reaches node A.3.4, the connection is established.

The signaling mechanism of the present invention is advantageous in that loop-free connections are created when a new node joins the multicast tree. For proof of the instant assertion, consider a particular peer-group at the lowest level. Paths are added to the DTL only under the following circumstances:

(i) A SETUP message reaches the ingress node.
    Since the ingress node is the only visited node in the peer-group at this stage, any path added to the DTL cannot create a loop.
(ii) A SETUP message reaches the core node.
    If the added path has a visited node, a RETRACE message is forwarded on the reverse path till the visited node is reached. This eliminates the possibility of a loop being created.
(iii) A RETRACE message reaches the egress node.
    If the added path has a visited node, a RETRACE message is forwarded on the reverse path till the visited node is reached. This eliminates the possibility of a loop being created.

As can be seen, none of the above conditions create a loop. Since this argument can be recursively extended to all levels of the hierarchy, the signaling mechanism thus ensures that the established connection is loop-free. As would be understood, similar mechanisms can be used for deleting a node from the multicast tree.

An attractive feature of present invention multicast routing scheme is its simplicity. Since nodes at each level follow the same algorithm, the invention is very easy to implement. Very little information about the membership to multicast groups is required to determine a path. Only the list of core nodes of the peer-group and its ancestors is flooded within a peer-group. Therefore, there is minimal overhead with the implementation.

A perceived disadvantage to the present invention is that the signaling mechanism involves different message types and appears somewhat complicated. Also, the condition that active core nodes have to be a part of the multicast tree can result in skewed trees, wherein skewed trees lead to waste in bandwidth. This happens when there are very few participant nodes and the core nodes are far from the participant nodes. The signaling mechanism of the present invention, however, ensures that there are no loops whenever a node joins an already existing multicast tree. Moreover, the cost of the tree generated by this algorithm is not far off from the cost of the pseudo-optimal tree generated by Steiner heuristics, and the tree satisfies the property that all nodes with degree I are either destination nodes or core nodes.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. A method for multicasting cells in a communications network, said communications network including a plurality of nodes coupled to one another by links, said method comprising the steps of:
    dividing said communications network into a hierarchical arrangement of peer groups including logical peer groups representative of a collection of nodes at a lower level of said hierarchical arrangement, wherein a peer group includes at least one of said nodes therein;
    building a multicast tree for a multicast group of nodes in said network which includes all participant nodes involved in a multicast, wherein a participant node is either a sender or receiver of data for said multicast group, said step of building including the steps of:
    selecting core nodes for each of said peer groups within said multicast group, wherein a node wanting to become part of said multicast group must register with a core node in its peer group;
    flooding core node identity information locally within each of said peer groups including said logical peer groups, wherein said nodes of a peer group need only maintain said identity information about said core nodes of direct ancestor peer groups; and
    selecting a peer group leader for each of said peer groups in said network for aggregating topology information of nodes in said peer group and flooding said topology information in higher level peer groups, said peer group leader flooding collected topology information from higher level peer groups into lower level peer groups, said collected topology information including a list of logical core nodes of ancestor peer groups for each said multicast group, wherein said peer group leader may be a different node than said core node in a peer group,
    wherein said cells are able to be efficiently multicast by way of said multicast tree to said nodes in said multicast group.

2. The method of claim 1, wherein said communications network is an ATM network and said cells are ATM cells.

3. The method of claim 1, wherein a core node is active if a participant node is in the same peer group to which the core node belongs, and further including requiring all active core nodes of a specific multicast group to be part of said multicast tree for said specific multicast group.

4. The method of claim 3, further including requiring a core node to be part of said multicast tree if an intermediate non-participant node on the multicast tree belongs to that same peer group.

5. The method of claim 4, further including pruning a corresponding core node and corresponding intermediate non-participant nodes from said multicast tree if there is no participant node in the corresponding peer group, and if said pruning does not disconnect said multicast tree.

6. The method of claim 1, wherein said topology information includes node and link state information.

7. The method of claim 1, further including attaching a non-core node wanting to join said multicast group to said core node within its peer group, wherein said core node joins the core node of a parent peer-group on said multicast tree in a recursive fashion if said core node is not part of said multicast tree.

8. The method of claim 1, wherein a non-core participant node leaving said multicast tree removes itself and a link between said non-core participant node and its neighbor, provided said non-core participant node has exactly one neighbor;

wherein if said non-core participant node has more than one neighbor, it remains on said multicast tree as a non-participant node, and a core node with no participant nodes in its peer group leaving said multicast tree is required to prune itself therefrom provided said pruning does not disconnect said multicast tree.

9. The method of claim 1, further including the steps of:

sending a SETUP message from a node wanting to join said multicast group towards a core node within its peer group; and reserving resources on a link for a connection, when a SETUP message passes on said link from one node to another, a path to said core node being expressed in terms of a designated transit list (DTL), where said DTL is an approximate path to be followed by signaling messages.

10. The method of claim 9, wherein said DTL created by a source can be modified by an ingress node to the peer-group, an egress node to the peer-group and a core node of the peer-group.

11. The method of claim 9, further including sending a RETRACE message, wherein said RETRACE message traverses only on links already traversed by a SETUP message in an opposite direction.

12. The method of claim 9, further including sending a CONNECT message, wherein said CONNECT message is sent by a node to which a joining node attaches, said CONNECT message traversing on all the links on which resources are reserved.

13. The method of claim 9, further including sending a RELEASE message, wherein said RELEASE message may be sent by any intermediate nodes, in case a connection cannot be established, said RELEASE message also being sent to terminate a connection, wherein said RELEASE message traverses on all the links on which resources are reserved.

14. The method of claim 9, wherein upon receiving said SETUP message, if the node is not on the multicast tree, said node checks the DTL and forwards a message to a next node in the DTL with a pointer, wherein if said node is an egress border node, said node saves a list of the nodes visited by said SETUP message and forwards said list across a border link, and wherein if said node is an ingress border node, said node computes a path to a core node of the peer-group, said path being converted to a new DTL and pushed onto a stack, wherein said SETUP message is then forwarded according to the new DTL towards the core node.

15. The method of claim 9, wherein upon receiving said SETUP message, if the node is a core node, said core node first checks if it is active, wherein if not active, said core node computes a path to a next peer-group in the DTL, wherein said path is converted to a new DTL and pushed onto a stack, and wherein if any node on said path has already been visited by said SETUP message, said SETUP message is changed to a RETRACE message.

16. The method of claim 15, wherein entries in the DTL are removed until a first entry on the top of said stack is a visited node and no other entry in the DTL is a visited node, said RETRACE message being forwarded towards a node from which said SETUP message was received, wherein if there are no visited nodes in said path, said SETUP message is forwarded as per said new DTL.

17. The method of claim 9, wherein upon receiving said SETUP message, if a core node is not active and the DTL stack is empty, said core node forwards said SETUP message towards a core node of a parent peer-group, wherein a path to a core node of said parent peer-group and a corresponding new DTL is computed and a check for a visited node is made, wherein if a visited node is found, said SETUP message is changed to a RETRACE message and the DTL is modified, and wherein if no visited nodes are found, the SETUP message is forwarded as per the new DTL.

18. The method of claim 11, wherein upon receiving a RETRACE message, if a first entry on top of the DTL stack does not match with a node ID or an ancestor ID, the RETRACE message is forwarded towards a node from which it received the SETUP message, wherein if the entry matches, a path to a next entry as per the DTL is computed, a check for visited nodes being made, wherein if there is a visited node, the DTL is modified and the RETRACE message is forwarded towards the node from which it received the SETUP message and if there is no visited node, the RETRACE message is changed to a SETUP message and forwarded to the next node as per the new DTL.

19. The method of claim 12, wherein for said CONNECT message, resources that are reserved on a link are committed, the node forwarding said message on all the links on which a SETUP was received, with the exception of a link on which said CONNECT is received.

20. The method of claim 13, wherein for said RELEASE message, resources that are reserved on a link are released, the node forwarding said message on all the links on which a SETUP was received/sent, with the exception of a link on which said RELEASE message is received.

21. A shared communications network for multicasting cells, said communications network including a plurality of nodes coupled to one another by links, said network comprising:

a hierarchical arrangement of peer groups making up said communications network, wherein a peer group includes at least one of said nodes therein;

one or more multicast trees for a multicast group of nodes in said network, which multicast trees include all participant nodes involved in a multicast, wherein a participant node is either a sender or receiver of data for said multicast group;

a core node selected for each of said peer groups within said multicast group, wherein a node wanting to become part of said multicast group must register with said core node in its peer group, wherein core node identity information is flooded locally within each of said peer groups, and said nodes of a peer group need only maintain said identity information about said core nodes of direct ancestor peer groups; and a peer group leader for each of said peer groups in said network for aggregating topology information of nodes in said peer group and flooding said topology information in higher level peer groups, wherein a list of logical core nodes of ancestor peer groups is flooded in a peer group by each said peer group leader, wherein said peer group leader may be a different node than said core node, wherein said cells are able to be efficiently multicast by way of said multicast tree to said nodes in said multicast group.

22. The network of claim 21, wherein said communications network is an ATM network and said cells are ATM cells.

23. A method for multicasting cells in a communications network, said communications network including a plurality of nodes coupled to one another by links, said method comprising the steps of:

dividing said communications network into a hierarchical arrangement of peer groups, wherein a peer group includes at least one of said nodes therein;

building a multicast tree for a multicast group of nodes in said network which includes all participant nodes involved in a multicast, wherein a participant node is either a sender or receiver of data for said multicast group, said step of building including the steps of:

selecting core nodes for each of said peer groups within said multicast group, wherein a node wanting to become part of said multicast group must register with a core node in its peer group;

flooding core node identity information locally within each of said peer groups, wherein said nodes of a peer group need only maintain identity information about said core nodes of direct ancestor peer groups; and selecting a peer group leader for each of said peer groups in said network for aggregating topology information of nodes in said peer group and flooding said topology information in higher level peer groups, wherein a list of logical core nodes of ancestor peer groups is flooded in a peer group by each said peer group leader.

* * * * *